US012033452B2

(12) United States Patent
Holt et al.

(10) Patent No.: US 12,033,452 B2
(45) Date of Patent: Jul. 9, 2024

(54) SYSTEMS AND METHODS FOR COUNTING AND MANAGING CURRENCY

(71) Applicant: Cassida Corporation, San Diego, CA (US)

(72) Inventors: Matthew J. Holt, San Diego, CA (US); Sural Yegin, Chula Vista, CA (US); Robert E. Frazier, San Diego, CA (US)

(73) Assignee: CASSIDA CORPORATION, San Diego, CA (US)

( * ) Notice: Subject to any disclaimer, the term of this patent is extended or adjusted under 35 U.S.C. 154(b) by 279 days.

(21) Appl. No.: 17/705,126

(22) Filed: Mar. 25, 2022

(65) Prior Publication Data

US 2023/0306807 A1 Sep. 28, 2023

(51) Int. Cl.

| | |
|---|---|
| ***G07D 11/50*** | (2019.01) |
| ***G07D 11/125*** | (2019.01) |
| ***G07D 11/32*** | (2019.01) |
| ***G07D 11/60*** | (2019.01) |

(52) U.S. Cl.

CPC ........... *G07D 11/50* (2019.01); *G07D 11/125* (2019.01); *G07D 11/32* (2019.01); *G07D 11/60* (2019.01)

(58) Field of Classification Search

CPC ........ G07D 11/32; G07D 11/50; G07D 11/60; G07D 11/132

USPC .......................................................... 209/534

See application file for complete search history.

(56) References Cited

U.S. PATENT DOCUMENTS

| | | | | |
|---|---|---|---|---|
| 3,468,419 | A * | 9/1969 | Lundin | B01D 33/72 210/402 |
| 4,846,352 | A * | 7/1989 | Bailey | B07B 1/48 209/403 |
| 8,391,583 | B1 * | 3/2013 | Mennie | G07D 7/003 235/379 |
| 2004/0074816 | A1 * | 4/2004 | Seyffert | B01D 33/0376 209/363 |
| 2006/0180509 | A1 * | 8/2006 | Burnett | B07B 1/46 209/405 |
| 2008/0105598 | A1 * | 5/2008 | Fisher | B07B 1/4645 209/404 |
| 2010/0270216 | A1 * | 10/2010 | Burnett | B01D 33/41 209/606 |
| 2014/0054216 | A1 * | 2/2014 | Burnett | B29C 45/14467 264/261 |
| 2019/0374976 | A1 * | 12/2019 | Herrington | B07B 1/469 |
| 2020/0238336 | A1 * | 7/2020 | Bailey | B06B 1/16 |

* cited by examiner

*Primary Examiner* — Terrell H Matthews

(74) *Attorney, Agent, or Firm* — Procopio, Cory, Hargreaves & Savitch LLP

(57) ABSTRACT

Devices, systems, methods, and non-transitory computer-readable media for counting and managing currency are provided herein. Contemplated systems can comprise one or more currency counting devices, and a computing device communicatively coupled to the one or more currency counting devices. The computing device can comprise one or more processors and a memory storing software instructions for guiding an operator through a counting operation and controlling the one or more currency counting devices, for example, based on an operator input.

22 Claims, 6 Drawing Sheets

SYSTEMS AND METHODS FOR COUNTING AND MANAGING CURRENCY

BACKGROUND

Field of the Invention

The embodiments described herein are generally directed to systems and methods for counting and managing currency.

Description of the Related Art

Retail and other businesses have a need to perform frequent counting operations for various point of sale devices and for accounting purposes. The currency counting process consumes significant time and can be inefficient when performed manually, even when known counting machines are used. In a typical retail environment, employees spend a significant amount of time on a daily or per shift basis, and there are often errors in the counting process due to, for example, a skipped step, inaccurate count, inaccurate calculations, and the like.

SUMMARY

Accordingly, devices, systems, methods, and non-transitory computer-readable media are disclosed to make currency counting and managing more efficient and accurate, with advantageous data sharing and management capabilities, among other things.

In some embodiments, a system is provided comprising a first currency counting device (e.g., notes/bill counting device), a second currency counting device (e.g., coin counting device), and a computing device communicatively coupled to the first and second currency counting devices. In some aspects, the first output device and the first input device of the system compose a touch panel display (e.g., of the computing device). The computing device can comprise one or more processors, and a memory storing software instructions that, when executed by the one or more processors, cause the one or more processors to (i) provide a first instruction, via a first output device, to insert a first set of currency into a first currency receiving component of the first currency counting device, (ii) cause the first currency counting device to count the first set of currency, (iii) receive, via a first input device, a first indication that all items in the first set of currency have been counted by the first currency counting device, (iv) provide a second instruction, via the first output device, to insert a second set of currency into a second currency receiving component of the second currency counting device, (v) cause the second currency counting device to count (and optionally sort) the second set of currency, (vi) receive, via a first input device, a second indication that all items in the second set of currency have been counted (and optionally sorted) by the second currency counting device, and (vii) generate a report relating to at least one of a safe and a cash drawer, the report based at least in part on a count of the first set of currency by the first currency counting device and a count of the second set of currency by the second currency counting device. In some aspects, the system further comprises a printer communicatively coupled to the computing device.

In some aspects, the software instructions, when executed by the one or more processors, additionally or alternatively cause the one or more processors to cause the one or more processors to print the report via the printer. In some aspects, the software instructions, when executed by the one or more processors, additionally or alternatively cause the one or more processors to cause the report to be displayed via the first output device or other output device. In some aspects, the software instructions, when executed by the one or more processors, additionally or alternatively cause the one or more processors to receive, via the first input device, an indication of a quantity of the first type of currency needed to build a till, cause the first currency counting device to count the quantity of the first type of currency and stop and/or pause, receive, via the first input device, an indication of a quantity of another type of currency needed to build the till, and cause the first currency counting device to count the quantity of the second type of currency and stop and/or pause. In some aspects, the software instructions, when executed by the one or more processors, additionally or alternatively cause the one or more processors to receive, via the first input device, an indication of a quantity of the first type of currency needed to build a till, receive, via the first input device, an indication of a number of tills, and cause the first currency counting device to count the quantity of the first type of currency multiplied by the number of tills, pausing after each instance the quantity of the first type of currency has been counted. In some aspects, the software instructions, when executed by the one or more processors, additionally or alternatively cause the one or more processors to reformat the report to generate a reformatted report according to a first template report, for example from a first format based on a system template report to a second format according to a first template report provided by a bank, cash pickup service, etc. In some aspects, the software instructions, when executed by the one or more processors, additionally or alternatively cause the one or more processors to transmit a notification to a remote user system, wherein the notification is associated with a cash pick up time.

For example, an operator can be presented, via the touch panel display, an option to select from available dates and times for a cash pickup from one or more local service provider. In some aspects, the software instructions, when executed by the one or more processors, can cause dynamic content (e.g., statuses, alerts, options of tasks and/or other items to select from) to be displayed to an operator (e.g., via the touch panel display), and translate user input into actions. An operator can input a selected date and time, which can then be transmitted to an external system operated by the cash pickup service provider to confirm, decline or propose an alternative time and optionally send a notification to the currency counting system operator. In some aspects, the software instructions, when executed by the one or more processors, additionally or alternatively cause the one or more processors to determine a quantity of the first type of currency and a quantity of the second type of currency for a till based at least in part on a count of the first set of currency by the first currency counting device and a count of the second set of currency by the second currency counting device, and upon receipt of an indication to build a till via the first input device, cause the first currency counting device to count the quantity of the first type of currency and stop. In some aspects, the software instructions, when executed by the one or more processors, cause the one or more processors to take any subset and/or combination of the steps described herein.

In some embodiments, a method is provided comprising using at least one hardware processor to provide a first instruction, via a first output device, to insert a first set of currency into a first currency receiving component of a first currency counting device, cause the first currency counting device to count the first set of currency, provide a second instruction, via the first output device, to insert a second set of currency into a second currency receiving component of a second currency counting device, cause the second currency counting device to count the second set of currency, receive an indication, via a first input device, that a count is complete, and generate a report relating to at least one of a safe, a cash drawer, a change drawer and/or other entity counted, the report based at least in part on a count of the first set of currency by the first currency counting device and a count of the second set of currency by the second currency counting device. In some aspects, the method can comprise using the at least one hardware processor to print and/or display the report. In some aspects, the method can comprise using the at least one hardware processor to receive, via the first input device, an indication of a quantity of the first type of currency needed to build a till, cause the first currency counting device to count the quantity of the first type of currency and stop, receive, via the first input device, an indication of a quantity of a third type of currency needed to build the till, and cause the first currency counting device to count the quantity of the third type of currency and stop. In some aspects, the method can comprise using the at least one hardware processor to receive, via the first input device, an indication of a quantity of the first type of currency needed to build a till, receive, via the first input device, an indication of a number of tills, and cause the first currency counting device to count the quantity of the first type of currency multiplied by the number of tills, pausing after each instance the quantity of the first type of currency has been counted. In some aspects, the method can comprise using the at least one hardware processor to reformat the report to generate a reformatted report according to a first template report. In some aspects, the method can comprise using the at least one hardware processor to transmit a notification to a remote user system, wherein the notification is associated with a currency pick up time. In some aspects, the method can comprise using the at least one hardware processor to determine a quantity of the first type of currency and a quantity of the second type of currency for a till based at least in part on a count of the first set of currency by the first currency counting device and a count of the second set of currency by the second currency counting device, and upon receipt of an indication to build a till via the first input device, cause the first currency counting device to count the quantity of the first type of currency and stop. In some aspects, the method can comprise using the at least one hardware processor to take any subset and/or combination of the steps described herein.

Any of the methods described herein may be embodied, individually or in any combination, in executable software modules of a processor-based system, such as a server, and/or in executable instructions stored in a non-transitory computer-readable medium.

In some embodiments, a non-transitory computer-readable medium having instructions stored therein is provided. In some aspects, the instructions, when executed by a processor, cause the processor to provide a first instruction, via a first output device, to insert a first set of currency into a first currency receiving component of a first currency counting device, cause the first currency counting device to count the first set of currency, provide a second instruction, via the first output device, to insert a second set of currency into a second currency receiving component of a second currency counting device, cause the second currency counting device to count the second set of currency, receive an indication, via a first input device, that a count is complete, and generate a report relating to at least one of a safe, a change drawer, a cash drawer and/or another entity counted, the report based at least in part on a count of the first set of currency by the first currency counting device and a count of the second set of currency by the second currency counting device. In some aspects, the instructions, when executed by the processor, cause the processor to display and/or print the report. In some aspects, the instructions, when executed by the processor, cause the processor to receive, via the first input device, an indication of a quantity of the first type of currency needed to build a till, cause the first currency counting device to count the quantity of the first type of currency and stop, receive, via the first input device, an indication of a quantity of a third type of currency needed to build the till, and cause the first currency counting device to count the quantity of the third type of currency and stop. In some aspects, the instructions, when executed by the processor, cause the processor to receive, via the first input device, an indication of a quantity of the first type of currency needed to build a till, receive, via the first input device, an indication of a number of tills, cause the first currency counting device to count the quantity of the first type of currency multiplied by the number of tills, pausing after each instance the quantity of the first type of currency has been counted. In some aspects, the instructions, when executed by the processor, cause the processor to reformat the report to generate a reformatted report according to a first template report. In some aspects, the instructions, when executed by the processor, cause the processor to transmit a notification to a remote user system, wherein the notification is associated with a currency pick up time. In some aspects, the instructions, when executed by the processor, cause the processor to determine a quantity of the first type of currency and a quantity of the second type of currency for a till based at least in part on a count of the first set of currency by the first currency counting device and a count of the second set of currency by the second currency counting device, and upon receipt of an indication to build a till via the first input device, cause the first currency counting device to count the quantity of the first type of currency and stop. In some aspects, the instructions, when executed by the processor, cause the processor to take any subset and/or combination of the steps described herein.

In some embodiments, a system is provided comprising a first currency counting device (e.g., a notes/bill counting device), a second currency counting device (e.g., a coin counting device), at least one hardware processor; and one or more software modules that are configured to, when executed by the at least one hardware processor, (i) provide a first instruction, via a first output device, to insert a first set of currency into a first currency receiving component of the first currency counting device, (ii) cause the first currency counting device to count the first set of currency, (iii) receive, via a first input device, a first indication that all items in the first set of currency have been counted by the first currency counting device, (iv) provide a second instruction, via the first output device, to insert a second set of currency into a second currency receiving component of the second currency counting device, (v) cause the second currency counting device to count the second set of currency, (vi) receive, via a first input device, a second indication that all items in the second set of currency have been counted by the second currency counting device, and (vii) generate a report relating to at least one of a safe, a change drawer, a cash drawer and/or another entity counted, the report based at least in part on a count of the first set of currency by the first currency counting device and a count of the second set of currency by the second currency counting device. In some aspects, the system further comprises a printer communicatively coupled to the computing device. In some aspects, the one or more software modules are configured to, when executed by the at least one hardware processor, additionally or alternatively cause the one or more processors to cause the one or more processors to print the report via the printer. In some aspects, the one or more software modules are configured to, when executed by the at least one hardware processor, additionally or alternatively cause the report to be displayed via the first output device or other output device. In some aspects, the one or more software modules are configured to, when executed by the at least one hardware processor, additionally or alternatively receive, via the first input device, an indication of a quantity of the first type of currency needed to build a till, cause the first currency counting device to count the quantity of the first type of currency and stop, receive, via the first input device, an indication of a quantity of a third type of currency needed to build the till, and cause the first currency counting device to count the quantity of the third type of currency and stop. In some aspects, the one or more software modules are configured to, when executed by the at least one hardware processor, additionally or alternatively receive, via the first input device, an indication of a quantity of the first type of currency needed to build a till, receive, via the first input device, an indication of a number of tills, and cause the first currency counting device to count the quantity of the first type of currency multiplied by the number of tills, pausing after each instance the quantity of the first type of currency has been counted. In some aspects, the one or more software modules are configured to, when executed by the at least one hardware processor, additionally or alternatively reformat the report to generate a reformatted report according to a first template report. In some aspects, the one or more software modules are configured to, when executed by the at least one hardware processor, additionally or alternatively transmit a notification to a remote user system, wherein the notification is associated with a currency pick up time. In some aspects, the one or more software modules are configured to, when executed by the at least one hardware processor, additionally or alternatively determine a quantity of the first type of currency and a quantity of the second type of currency for a till based at least in part on a count of the first set of currency by the first currency counting device and a count of the second set of currency by the second currency counting device, and upon receipt of an indication to build a till via the first input device, cause the first currency counting device to count the quantity of the first type of currency and stop. In some aspects, the one or more software modules are configured to, when executed by the at least one hardware processor, take any subset and/or combination of the steps described herein.

Other advantages and benefits of the disclosed compositions and methods will be apparent to one of ordinary skill with a review of the following drawings and detailed description.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for counting and/or managing currency (e.g., notes (also referred to herein as bills), coins).

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In some aspects, the systems described herein can be used, for example, in one or more retails stores, restaurants, grocery stores, coffee shops, big box stores, department stores, as well as in chain of stores. For example, each retail store of a chain of retail stores or a subset thereof can use a currency counting system as shown in FIG. 1, and data can be transferred and/or shared between different currency counting systems of different retail stores (e.g., 230) and/or between one or more currency counting systems and a platform, for example, platform 210, which can be operated by an owner(s) of the chain of retail stores (or subset thereof), or an operator, manager, officer or other entity on behalf of the owner(s).

Figure 1:
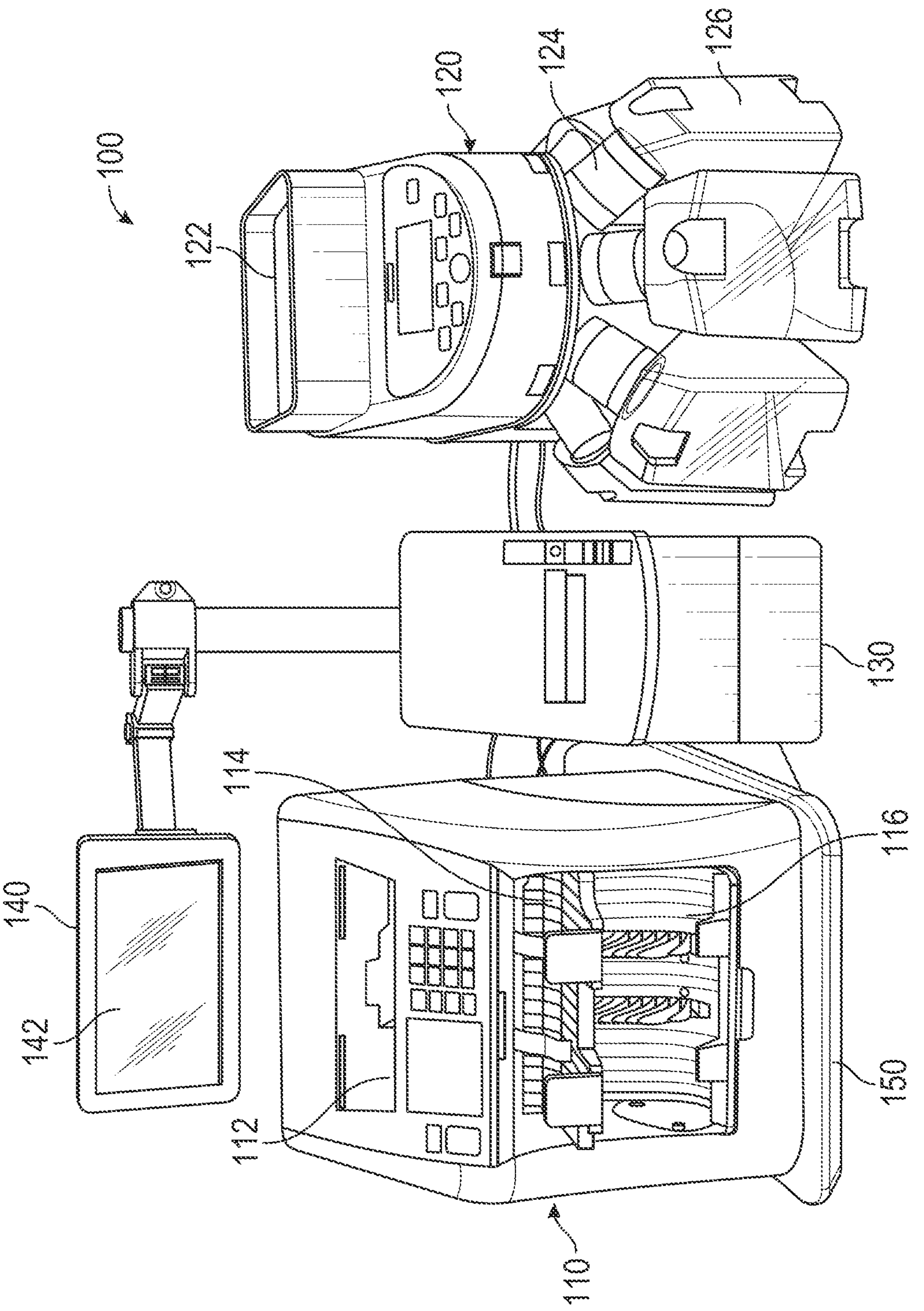
FIG. 1 illustrates a system for counting and managing currency, according to an embodiment.

FIG. 1 illustrates a system for counting and managing currency, according to an embodiment. System 100 comprises a notes/bill counting device 110, a coin counting device 120, and a computing device 140 communicatively coupled to counting device 110 and counting device 120 (e.g., via USB connections). The computing device 140 can comprise and/or be communicatively coupled to a printer 130. The computing device can comprise a tablet comprising a touch panel display 142 that, among other things, indicates a status, displays instructions for an operator, and receives inputs from an operator.

Counting device 110 can be positioned on a stand (e.g., Olympus Stand) that provides a designated area for different components of the system. The stand can comprise, for example, an articulated arm with a computing device mounted to it such that the computing device can be positioned in a way that makes it easily accessible by an operator. Counting device 110 (which can comprise a currency discriminator) comprises a currency receiving component (or hopper) 112, a rejected notes tray 114, and a notes stacker 116. Counting device 110 can have any suitable counting speed (e.g., 100-2000, 500-1500, or 800-1000 bills/minute), hopper capacity (e.g., 300 bills, 400 bills, 500 bills, at least 300 bills, at least 400 bills, at least 500 bills, at least 600 bills), reject capacity (e.g., 50 bills, 75 bills, 100 bills, 200 bills, at least 50 bills, at least 75 bills, at least 100 bills, at least 200 bills), and stacker capacity (e.g., 100 bills, 200 bills, 300 bills, at least 100 bills, at least 200 bills, at least 300 bills, at least 500 bills). Counting device 110 can further include a counterfeit detection feature, and be configured to sort and strap notes of different denominations (e.g., $1, $2, $5, $10, $20, $50, $100). In some aspects, counting device 100 can include a plurality of modes, including mixed, sort, face, orientation, ValuSort™, Strapping, etc. Counting device 120 can comprises a currency receiving component (or hopper) 122, a set of coin chutes 124, and a set of coin bins 126. Counting device 120 can have any suitable counting speed (e.g., 800-1100 or about 950 coins per minute), hopper capacity (e.g., 1000-1600, or about 1300 quarters), coin bin capacity (e.g., 300-500 or about 400 quarters), and may be configured to count and sort coins of different denominations (e.g., pennies, nickels, dimes, quarters, dollar coins). In some aspects, the coin counting device(s) can be controlled by a computing device, for example, via one or more USB cables and compatible interfaces contained within the counting device(s). In some aspects, one or more counting devices can comprise a motherboard that takes control of the counting device and allows for a USB interface to where the computing device can control the coin counting device. The motherboard can comprise a serial number printed thereon. In some aspects, one or more counting devices can comprise a high speed coin sorter and counter with batch capability (stopping when a specified number of coins of a particular denomination has been sent to a designated coin bin or bag). Each coin denomination can comprise its own collection bin or coin baggie that couples to the chute or output pipe. The coin baggies make sorting known bundles of coins easier later on during the "Build Tills" phase. The counting device can have a control panel with buttons, and Applicant has developed a control board that allows the counting device to be controlled by a computing device separate from the counting device (e.g., computing device 140). The control board can essentially make the counting device behave as if the buttons were pressed on the counting device control panel. The USB connection can be for a USB serial device (e.g., an FTDI USB serial I.C.) and use a custom protocol between the computing device and the control board. The control board can use a microcontroller (e.g., an Atmel ATXMega series processor) to interpret the commands and send back information. In some aspects, it can also route the counting device's serial printer output as-is back to the computing device. In this way the computing device can command the coin counting device to print a report, which can then be sent via the USB serial line. In some aspects, various status information (e.g., motor state) can be sent from the control board to the computing device. The computing device can use the motor state and requested print reports (e.g., indicating the total count) and commands to simulate pressing buttons on the unit, to control the coin counting process automatically.

The counting devices can be coupled to the computing device in any suitable manner, including for example, via a wireless connection (e.g., via Bluetooth, WiFi) and/or via a wired connection (e.g., USB cable(s)). In some aspects, the computing device can control the counting devices (e.g., start and stop a count), determine if a motor is spinning or not, identify the counting machine(s) and know if it has been swapped out, and/or track the counting device's usage. For example, in some aspects, computing device can cause coin counting device to automatically stop after 50 coins (e.g., number of coins in a coin roll) to make it easy to create rolls and/or batches of coins. Viewed from another perspective, the counting devices of a system can be controlled by an external computing device.

In some aspects, an operating system (e.g., Linux or any other suitable operating system) on the computing device can, among other things, facilitate the running of software, the storage of data, and data communications.

System Overview

Infrastructure

Figure 2:
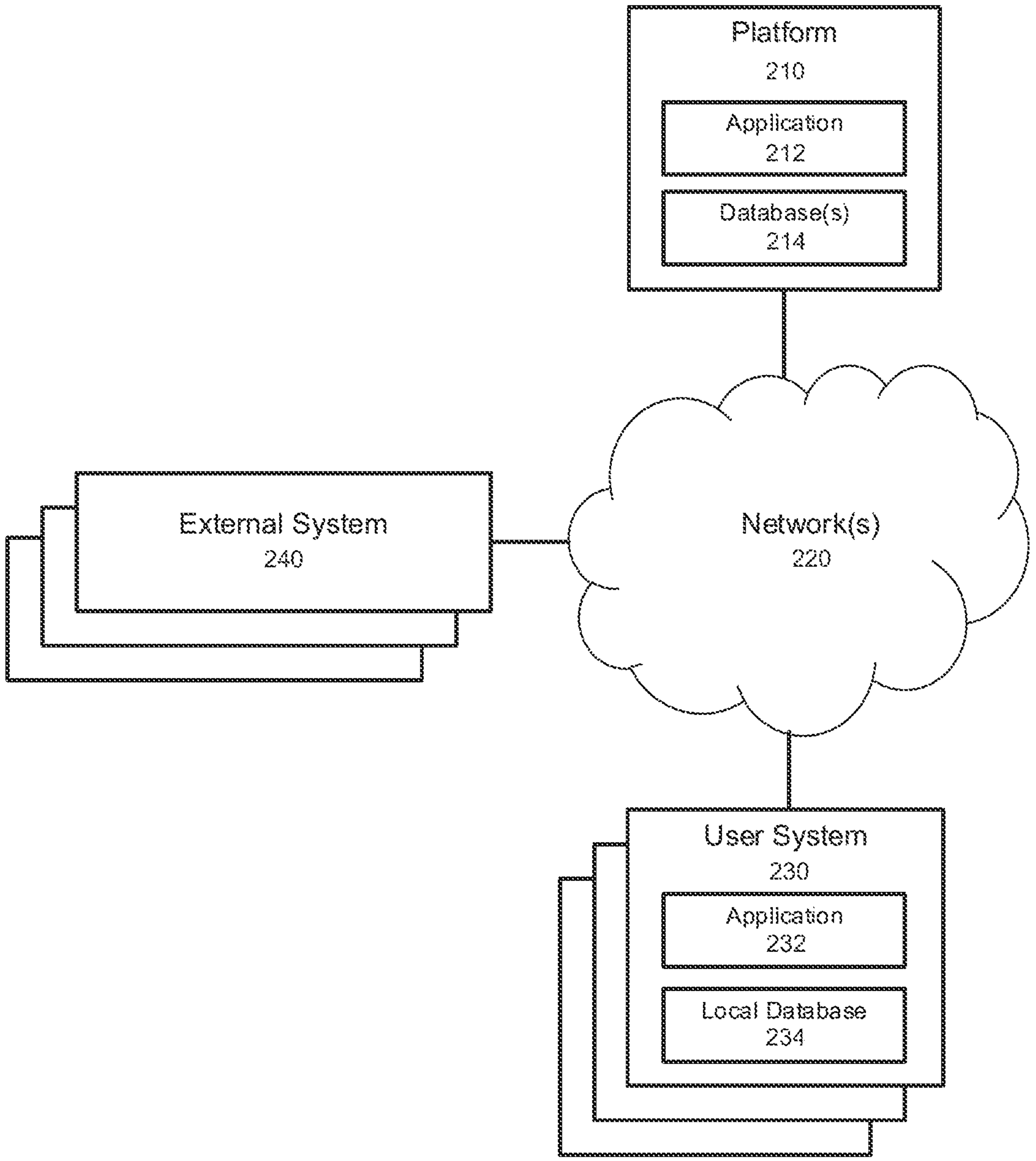
FIG. 2 illustrates an example infrastructure, in which one or more of the processes described herein, may be implemented, according to an embodiment.

FIG. 2 illustrates an example infrastructure in which one or more of the disclosed processes may be implemented, according to an embodiment. The infrastructure may comprise a platform 210 (e.g., one or more servers) which hosts and/or executes one or more of the various functions, processes, methods, and/or software modules described herein. Platform 210 may comprise dedicated servers, or may instead comprise cloud instances, which utilize shared resources of one or more servers. These servers or cloud instances may be collocated and/or geographically distributed. Platform 210 may also comprise or be communicatively connected to a server application 212 and/or one or more databases 214. In addition, platform 210 may be communicatively connected to one or more user systems 230 via one or more networks 220, or may be entirely implemented on the loopback (e.g., localhost) interface. Platform 210 may also be communicatively connected to one or more external systems 240 (e.g., other platforms, websites, etc.) via one or more networks 220.

Network(s) 220 may comprise the Internet, and platform 210 may communicate with user system(s) 230 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 210 is illustrated as being connected to various systems through a single set of network(s) 220, it should be understood that platform 210 may be connected to the various systems via different sets of one or more networks. For example, platform 210 may be connected to a subset of user systems 230 and/or external systems 240 via the Internet, but may be connected to one or more other user systems 230 and/or external systems 240 via an intranet. Furthermore, while only a few user systems 230 and external systems 240, one server application 212, and one set of database(s) 214 are illustrated, it should be understood that the infrastructure may comprise any number of user systems, external systems, server applications, and databases. In addition, communication between any of these systems, for example, platform 210, user systems 230, and/or external system 240, may be entirely implemented on the loopback (e.g., localhost) interface.

User system(s) 230 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 230 may comprise or be communicatively connected to a client application 232 and/or one or more local databases 234. User system 230 may comprise, for example, computing device 140 of FIG. 1. While user system 230 and platform 210 are shown here as separate devices connected by a network 220. User system 230 may comprise an application 232 that may comprise one portion of a distributed cloud-based system that integrates with platform 210, for example, using a multi-tasking OS (e.g., Linux) and local only (localhost) network addresses.

Platform 210 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 210 transmits or serves one or more screens of the graphical user interface in response to requests from user system(s) 230. In some embodiments, these screens may be served in the form of a screen-by-screen guided template, in which case two or more screens may be served in a sequential manner, and one or more templates of the sequential screens may depend on an interaction of the user or user system 230 with one or more preceding screens (e.g., an input into a template of a preceding screen). The requests to platform 210 and the responses from platform 210, including the screens of the graphical user interface, may both be communicated through network(s) 220, which may include the Internet, or may be entirely implemented on the loopback (e.g., localhost) interface, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 214) that are locally and/or remotely accessible to platform 210. Platform 210 may also respond to other requests from user system(s) 230.

Platform 210 may comprise, be communicatively coupled with, or otherwise have access to one or more database(s) 214. For example, platform 210 may comprise one or more database servers which manage one or more databases 214. Server application 212 executing on platform 210 and/or client application 232 executing on user system 230 may submit data (e.g., user data, form data, etc.) to be stored in database(s) 214, and/or request access to data stored in database(s) 214. Any suitable database may be utilized, including without limitation MySQL™ Oracle™, IBM™, Microsoft SQL™, Access™, PostgreSQL™, MongoDB™, and the like, including cloud-based databases and proprietary databases. Data may be sent to platform 210, for instance, using the well-known POST, GET, and PUT request supported by HTTP, via FTP, proprietary protocols, requests using data encryption via SSL (HTTPS requests), and/or the like. This data, as well as other requests, may be handled, for example, by server-side web technology, such as a servlet or other software module (e.g., comprised in server application 212), executed by platform 210.

In embodiments in which a web service is provided, platform 210 may receive requests from external system(s) 240, and provide responses in eXtensible Markup Language (XML), JavaScript Object Notation (JSON), and/or any other suitable or desired format. In such embodiments, platform 210 may provide an application programming interface (API) which defines the manner in which user system(s) 230 and/or external system(s) 240 may interact with the web service. Thus, user system(s) 230 and/or external system(s) 240 (which may themselves be servers), can define their own user interfaces, and rely on the web service to implement or otherwise provide the backend processes, methods, functionality, storage, and/or the like, described herein. For example, in such an embodiment, a client application 232, executing on one or more user system(s) 230, may interact with a server application 212 executing on platform 210 to execute one or more or a portion of one or more of the various functions, processes, methods, and/or software modules described herein. In an embodiment, client application 232 may utilize a local database 234 for storing data locally on user system 230.

Client application 232 may be "thin," in which case processing is primarily carried out server-side by server application 212 on platform 210. A basic example of a thin client application 232 is a browser application, which simply requests, receives, and renders webpages at user system(s) 230, while server application 212 on platform 210 is responsible for generating the webpages and managing database functions. Alternatively, the client application may be "thick," in which case processing is primarily carried out client-side by user system(s) 230. It should be understood that client application 232 may perform an amount of processing, relative to server application 212 on platform 210, at any point along this spectrum between "thin" and "thick," depending on the design goals of the particular implementation. In any case, the software described herein, which may wholly reside on either platform 210 (e.g., in which case server application 212 performs all processing) or user system(s) 230 (e.g., in which case client application 232 performs all processing) or be distributed between platform 210 and user system(s) 230 (e.g., in which case server application 212 and client application 232 both perform processing), can comprise one or more executable software modules comprising instructions that implement one or more of the processes, methods, or functions described herein.

While platform 210, user systems 230, and external systems 240 are shown as separate devices communicatively coupled by network 220, each of the devices shown as platform 210, user systems 230, and external systems 240 may be implemented on one or more devices, and/or one or more of platform 210, user systems 230, and external systems 240 may be implemented on a single device.

Example Processing Device

Figure 3:
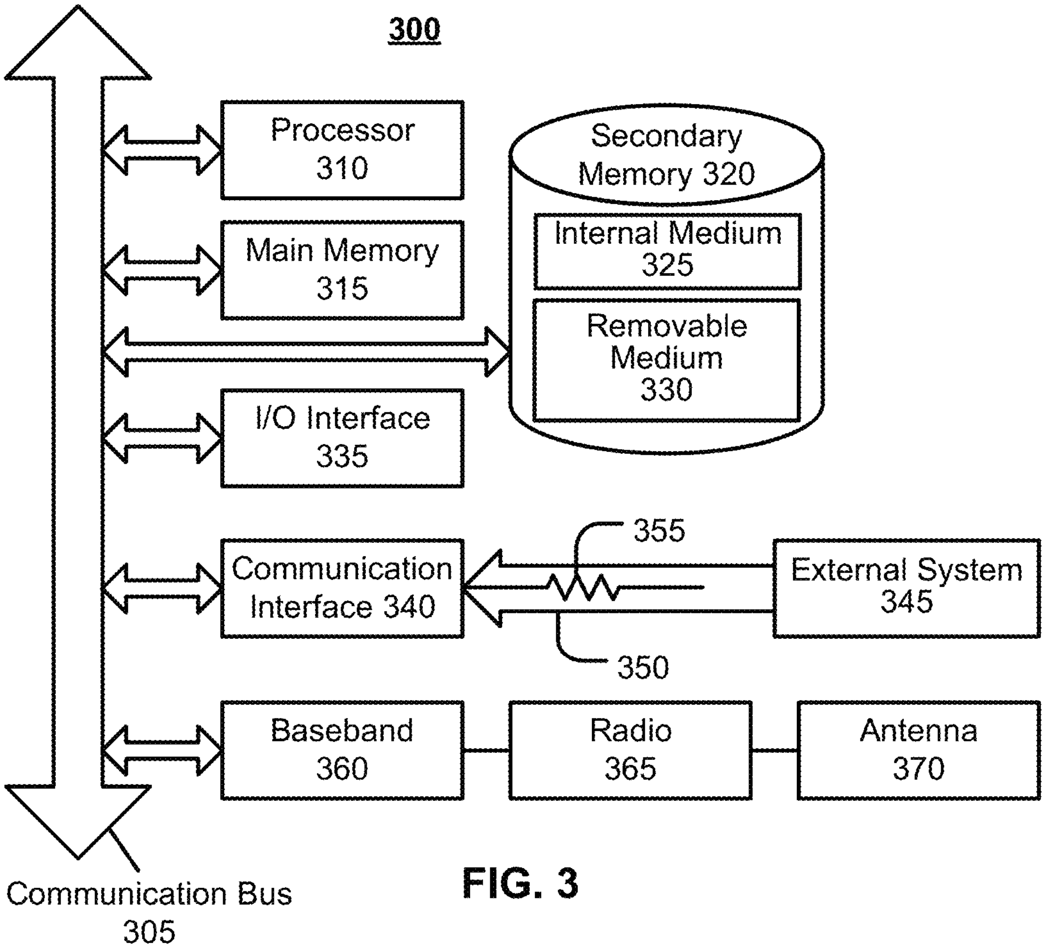
FIG. 3 illustrates an example processing system, by which one or more of the processes described herein, may be executed, according to an embodiment.

FIG. 3 is a block diagram illustrating an example wired or wireless system 300 that may be used in connection with various embodiments described herein. For example, system 300 may be used as or in conjunction with one or more of the functions, processes, or methods (e.g., to store and/or execute the software) described herein, and may represent components of platform 210, user system(s) 230, external system(s) 240, and/or other processing devices described herein. System 300 can be a server or any conventional personal computer, or any other processor-enabled device that is capable of wired or wireless data communication. Other computer systems and/or architectures may be also used, as will be clear to those skilled in the art.

System 300 preferably includes one or more processors 310. Processor(s) 310 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 310.

Processor 310 is preferably connected to a communication bus 305. Communication bus 305 may include a data channel for facilitating information transfer between storage and other peripheral components of system 300. Furthermore, communication bus 305 may provide a set of signals used for communication with processor 310, including a data bus, address bus, and/or control bus (not shown). Communication bus 305 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 300 preferably includes a main memory 315 and may also include a secondary memory 320. Main memory 315 provides storage of instructions and data for programs executing on processor 310, such as any of the software discussed herein. It should be understood that programs stored in the memory and executed by processor 310 may be written and/or compiled according to any suitable language, including without limitation C/C++, Java, JavaScript, Perl, Visual Basic, NET, Python, PUP, and the like. Main memory 315 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 320 is a non-transitory computer-readable medium having computer-executable code (e.g., any of the software disclosed herein) and/or other data stored thereon. The computer software or data stored on secondary memory 320 is read into main memory 315 for execution by processor 310. Secondary memory 320 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 320 may optionally include an internal medium 325 and/or a removable medium 330. Removable medium 330 is read from and/or written to in any well-known manner. Removable storage medium 330 may be, for example, a magnetic tape drive, a compact disc (CD) drive, a digital versatile disc (DVD) drive, other optical drive, a flash memory drive, and/or the like.

In alternative embodiments, secondary memory 320 may include other similar means for allowing computer programs or other data or instructions to be loaded into system 300. Such means may include, for example, a communication interface 340, which allows software and data to be transferred from external storage medium 345 to system 300. Examples of external storage medium 345 include an external hard disk drive, an external optical drive, an external magneto-optical drive, and/or the like.

As mentioned above, system 300 may include a communication interface 340. Communication interface 340 allows software and data to be transferred between system 200 and external devices (e.g. printers), networks, or other information sources. For example, computer software or executable code may be transferred to system 300 from a network server (e.g., platform 210) via communication interface 340. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 300 with a network (e.g., network(s) 120) or another computing device. Communication interface 340 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 340 are generally in the form of electrical communication signals 355. These signals 355 may be provided to communication interface 340 via a communication channel 350. In an embodiment, communication channel 350 may be a wired or wireless network (e.g., network(s) 220), or any variety of other communication links. Communication channel 350 carries signals 355 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 315 and/or secondary memory 320. Computer-executable code can also be received via communication interface 340 and stored in main memory 315 and/or secondary memory 320. Such computer programs, when executed, enable system 300 to perform the various functions of the disclosed embodiments as described elsewhere herein.

In this description, the term "computer-readable medium" is used to refer to any non-transitory computer-readable storage media used to provide computer-executable code and/or other data to or within system 300. Examples of such media include main memory 315, secondary memory 320 (including internal memory 325, removable medium 330, and external storage medium 345), and any peripheral device communicatively coupled with communication interface 340 (including a network information server or other network device). These non-transitory computer-readable media are means for providing software and/or other data to system 300.

In an embodiment that is implemented using software, the software may be stored on a computer-readable medium and loaded into system 300 by way of removable medium 330, I/O interface 335, or communication interface 340. In such an embodiment, the software is loaded into system 300 in the form of electrical communication signals 355. The software, when executed by processor 310, preferably causes processor 310 to perform one or more of the processes and functions described elsewhere herein.

In an embodiment, I/O interface 335 provides an interface between one or more components of system 300 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 300 may also include optional wireless communication components that facilitate wireless communication over a voice network and/or a data network (e.g., in the case of user system 230). The wireless communication components comprise an antenna system 370, a radio system 365, and a baseband system 360. In system 300, radio frequency (RF) signals are transmitted and received over the air by antenna system 370 under the management of radio system 265.

In an embodiment, antenna system 370 may comprise one or more antennae and one or more multiplexors (not shown) that perform a switching function to provide antenna system 370 with transmit and receive signal paths. In the receive path, received RF signals can be coupled from a multiplexor to a low noise amplifier (not shown) that amplifies the received RF signal and sends the amplified signal to radio system 365.

In an alternative embodiment, radio system 365 may comprise one or more radios that are configured to communicate over various frequencies. In an embodiment, radio system 365 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 365 to baseband system 360.

If the received signal contains audio information, then baseband system 360 decodes the signal and converts it to an analog signal. Then the signal is amplified and sent to a speaker. Baseband system 360 also receives analog audio signals from a microphone. These analog audio signals are converted to digital signals and encoded by baseband system 360. Baseband system 360 also encodes the digital signals for transmission and generates a baseband transmit audio signal that is routed to the modulator portion of radio system 365. The modulator mixes the baseband transmit audio signal with an RF carrier signal, generating an RF transmit signal that is routed to antenna system 370 and may pass through a power amplifier (not shown). The power amplifier amplifies the RF transmit signal and routes it to antenna system 370, where the signal is switched to the antenna port for transmission.

Baseband system 360 is also communicatively coupled with processor(s) 310. Processor(s) 310 may have access to data storage areas 315 and 320. Processor(s) 310 are preferably configured to execute instructions (i.e., computer programs, such as the disclosed software) that can be stored in main memory 315 or secondary memory 320. Computer programs can also be received from baseband processor 360 and stored in main memory 310 or in secondary memory 320, or executed upon receipt. Such computer programs, when executed, can enable system 300 to perform the various functions of the disclosed embodiments.

Process Overview

Embodiments of processes for counting and managing currency will now be described in detail. It should be understood that the described processes may be embodied in one or more software modules that are executed by one or more hardware processors (e.g., processor 310), for example, as a software application (e.g., server application 212, client application 232, and/or a distributed application comprising both server application 212 and client application 232), which may be executed wholly by processor(s) of platform 210, wholly by processor(s) of user system(s) 230, or may be distributed across platform 210 and user system(s) 230, such that some portions or modules of the software application are executed by platform 210 and other portions or modules of the software application are executed by user system(s) 230. The described processes may be implemented as instructions represented in source code, object code, and/or machine code. These instructions may be executed directly by hardware processor(s) 230, or alternatively, may be executed by a virtual machine operating between the object code and hardware processor(s) 310. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In some embodiments, a system is provided comprising a first currency counting device (e.g., notes/bill counting device), a second currency counting device (e.g., coin counting device), and a computing device communicatively coupled to the first and second currency counting devices and configured to control an operation of each of the first and second currency counting devices.

While the systems described herein generally comprise two currency counting devices, one for notes, and another for coins, it should be appreciated that any suitable number of counting devices (e.g., 1, 2, 3, 4, 5, at least 1, at least 2, at least 3) of any suitable types can be provided in contemplated systems. Some exemplary counting devices include, for example, the coin counters shown and described in U.S. Patent Application Publication No. 2021/0225110 to Cassida Corporation, a Zeus™ 2-pocket currency discriminator from Cassida Corporation, and a C400™ Business-Grade High Speed Coin Sorter and Counter by Cassida Corporation. This and all other extrinsic materials discussed herein, including publications, patent applications, and patents, are incorporated by reference in their entirety. Where a definition or use of a term in an incorporated reference is inconsistent or contrary to the definition of that term provided herein, the definition of that term provided herein applies and the definition of the term in the reference does not apply.

In some aspects, the first output device and the first input device can be combined, for example, in the case of a touch panel display of (and/or coupled to) the computing device (e.g., a smartphone, tablet, mobile device). However, any suitable number (e.g., 1, 2, 3, 4, 5, at least 1, at least 2, at least 3) of input devices (e.g., keyboards, microphones) and/or output devices (e.g., speaker, display) may be provided in contemplated systems, and may include any suitable types of input and output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, CRTs, plasma displays, LED displays, LCDs, printers, VFDs, SEDs, FEDs, and/or the like.

The computing device can comprise one or more processors configured to execute instructions to (i) provide a first instruction, via the first output device (e.g., touch screen of and/or coupled to the computing device), to insert a first set of currency into a first currency receiving component of the first currency counting device, (ii) cause the first currency counting device to count the first set of currency (e.g., upon a detection of the currency in the first currency receiving component and/or based on a user indication (e.g., via the touch screen) that the currency has been placed in the first currency receiving component), (iii) receive, via the first input device (e.g., touch screen of and/or coupled to the computing device), a first indication that all items in the first set of currency have been counted by the first currency counting device, (iv) provide a second instruction, via the first output device, to insert a second set of currency into a second currency receiving component of the second currency counting device, (v) cause the second currency counting device to count the second set of currency (e.g., upon a detection of the currency in the first currency receiving component and/or based on a user indication (e.g., via the touch screen) that the currency has been placed in the second currency receiving component), (vi) receive, via a first input device, a second indication that all items in the second set of currency have been counted by the second currency counting device, and (vii) generate a report relating to at least one of a safe, a change drawer, a cash drawer and/or another entity (e.g., based on a user request or indication that an entity count is complete (e.g., via the touch screen)), the report based at least in part on a count of the first set of currency by the first currency counting device and a count of the second set of currency by the second currency counting device. It should be appreciated that some or all of the steps can be repeated. For example, steps (i), (ii), and/or (iii) can be repeated for each denomination of notes to be placed in the first currency counting device (e.g., $1s, $5s, $10s, $20s, $50s, $100s). For example, steps (iv), (v), and/or (vi) can be repeated for each denomination of coins to be placed in the second currency counting device (e.g., pennies, nickels, dimes, quarters, half dollars, dollars). In some aspects, for example where a user does not have any notes and/or coins of a certain denomination, the user can be presented with an option to skip one or more steps for such notes and/or coins. In some aspects, the system further comprises a printer communicatively coupled to the computing device. In some aspects, the one or more processors are configured to execute instructions to cause the one or more processors to print the report via the printer. In some aspects, the one or more processors are configured to execute instructions to cause the report to be displayed via the first output device or other output device and/or to be transmitted to at least one of a platform, an external system and a user system. The report can include, among other things, a total count for each denomination of notes and coins, a total amount for each denomination of notes and coins, a difference between the total amount of currency counted and a starting amount (e.g., starting amount in a new till, amount in a safe at the previous count, amount in a change drawer at the previous count). In some aspects, the one or more processors can be configured to execute instructions to determine, via a query of one or more databases, whether a threshold number of notes and/or coins of a certain denomination is reached (e.g., whether the number of total notes and/or the amount of total notes exceeds a threshold amount set for scheduling a cash pick up; whether a total number of a large note (e.g., $20s or $100s) indicate such notes need to be exchanged for smaller notes (e.g., $1s and $5s)). In some aspects, the one or more processors can be configured to execute instructions to, upon determining that a threshold is met, transmit a notification (e.g., to the touch screen of the computing device, to a user system (e.g., a mobile or other device of a manager of the retail store where the currency counting system is located), to an external system (e.g., one operated by a cash pickup service provider or bank), to a platform (e.g., one operated by a district manager of retail stores including the retail store where the currency counting system is located, or by a corporation or other entity that owns and/or operates several retail stores including the retail store where the currency counting system is located), that an action is needed (e.g., scheduling a cash pick up, a bank transaction). In some aspects, the one or more processors are configured to execute instructions to receive, via the first input device, an indication of a quantity of the first type of currency needed to build a till, cause the first currency counting device to count the quantity of the first type of currency and stop, receive, via the first input device, an indication of a quantity of a third type of currency needed to build the till, and cause the first currency counting device to count the quantity of the third type of currency and stop. In some aspects, the one or more processors are configured to execute instructions to receive, via the first input device, an indication of a quantity of the first type of currency needed to build a till, receive, via the first input device, an indication of a number of tills, and cause the first currency counting device to count the quantity of the first type of currency multiplied by the number of tills, pausing after each instance the quantity of the first type of currency has been counted. In some aspects, the one or more processors are configured to execute instructions to reformat the report to generate a reformatted report according to a first template report. In some aspects, the one or more processors are configured to execute instructions to transmit a notification to a remote user system, wherein the notification is associated with a currency pick up time. In some aspects, the one or more processors are configured to execute instructions to determine a quantity of the first type of currency and a quantity of the second type of currency for a till based at least in part on a count of the first set of currency by the first currency counting device and a count of the second set of currency by the second currency counting device, and upon receipt of an indication to build a till via the first input device, cause the first currency counting device to count the quantity of the first type of currency and stop. In some aspects, the one or more processors are configured to execute instructions to take any subset and/or combination of the steps described herein. In some aspects, the one or more processors are configured to execute instructions to take any combination of any of the steps shown and described in FIGS. 4 and 6.

In some aspects, a computing device of a system for counting and managing currency in, for example, a retail store, can act as a user system 130. The computing device can contain a processing system with instructions. The device therefore can comprise a system 300 with one or more counting devices interfaced, e.g., via I/O interface 335. In some aspects, the system may communicate with the counting devices, via communication interface 340 and/or radio 365. In some aspects, the system can determine, for example, based at least in part on the data received from the counting devices and/or a user input via a touch panel screen of and/or coupled to the computing device and a query of one or more databases comprising threshold data, notes data, coin data, retail store location data and/or any other suitable data that, for example, a cash pick up is needed, an adjustment to cash counting protocol, and/or a bank transaction is needed. In some aspects, the system can generate and/or present an alert associated with the need based at least in part on the data received from the counting devices and/or a user input via a touch panel screen of and/or coupled to the computing device and/or data stored in one or more databases. This alert can be communicated, for example, back to a platform 210 operated by, or on behalf of, for example, a company that owns and operates retail stores including the retail store where the computing device and/or system is located. In some aspects, the system may communicate with platform 210, a user system and/or an external system. In some aspects, the system can transmit data associated with the counting devices and/or user inputs to platform 210, a user system and/or an external system. In some aspects, the platform 210 can determine, for example, based at least in part on the data received from the counting devices and/or a user input via a touch panel screen of and/or coupled to the computing device and a query of one or more databases comprising threshold data, notes data, coin data, retail store location data and/or any other suitable data that, for example, a cash pick up is needed, an adjustment to cash counting protocol, and/or a bank transaction is needed. Platform 210 can generate and/or present an alert associated with the need to a user system and/or an external system based at least in part the need. In some aspects, platform 210 can communicate with an external system and generate and/or transmit an option to scheduling a service (e.g., cash pick up) to a user system (e.g., a currency counting system). Thus, a transaction can be triggered based on data obtained via one or more currency counting systems (e.g., indicating amount, number and/or type of cash in a store) rather than based on a calendar event (e.g. every two weeks). Contemplated external systems can include, for example, a system operated by a bank and/or a cash pickup service provider, which can ensure a steady supply of certain types of notes and coins (e.g., $1s and $5s) without paying for unnecessary pickups based solely on a recurring schedule. In some aspects, a currency counting system of the inventive subject matter can integrate with third party platforms (e.g., via WiFi, ethernet, cellular). In some aspects, the computing device can store data, such as threshold data, notes data, coin data, retail store location data and/or any other suitable data, for example, in database 234. In some aspects, platform 210 can store data, such as threshold data, notes data, coin data, retail store location data and/or any other suitable data, for example, in database 214.

Figure 4:
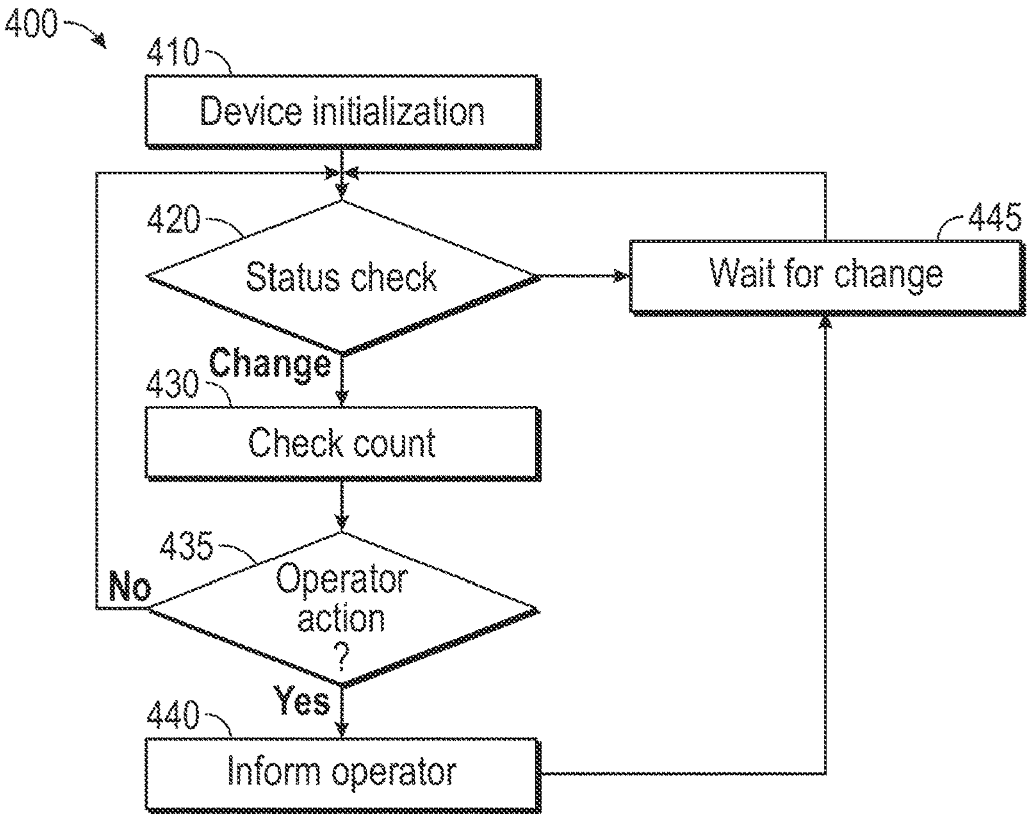
FIG. 4 illustrates a main loop in a device control process, according to an embodiment.

FIG. 4 illustrates a simplified flowchart 400 of a main loop in a device control process that waits for the counting device (e.g., bill counting device (also referred to herein as notes counting device), coin counting device) to change states and then acts accordingly, according to an embodiment. In both cases, the process can be far more complex and involves multiple threads of execution. However, it can be simplified to be described in more general terms and concepts to illustrate its overall functionality and method. Once the device initialization 410 is complete, a status is checked 420 and the main loop waits for a change in status 445 and then acts accordingly. If the status requires an operator action 435 (e.g., after check count step 430), the operator is informed of the state change through a user interface 440, and of any action that needs to be taken. The check count step 430 can comprises detecting that a counting device has responded to a request to get the current count. The state change can be as simple as a tray being full, a hopper being empty, a motor stopping, or a batch count being reached. In some aspects, the program logic can present information to the operator along with any instructions such as "hopper empty—please add notes to continue" or "nickels batch" if the coin counting device stops on batch. The operator can have the opportunity to stop the counting process if necessary, and the ability to go back later and, for example, add more coins or re-count the notes. The system can also detect error states and inform the operator to take appropriate action. When an operator action is needed, the main loop can obtain the most recent count information so that the display can be updated. The system can be configured to wait for a confirmation (user input) from the operator before proceeding to execute the next step.

Viewed from another perspective, in some embodiments, after initializing the counting device and any background threads of execution that are needed, the main loop of the device control task continuously polls the status of the counting device, depending upon the method of communication needed. In one example, both the bill counting device and the coin counting device use a USB serial device to communicate in both directions. The main loop (or its worker thread) can send commands via the operating system's USB serial device driver and receive responses containing status codes or other information. It can then the results and save it in an internal structure, updating status. If operator intervention is required, it can pause the operation until the operator responds via the user interface. The user interface can communicate with the control program via a web request to indicate how the operator responded, and the control program can either proceed or exit from the main loop, depending on the response received. Upon exit, the device control task will clean up any resources it allocated and indicate that the task is complete.

Figure 5:
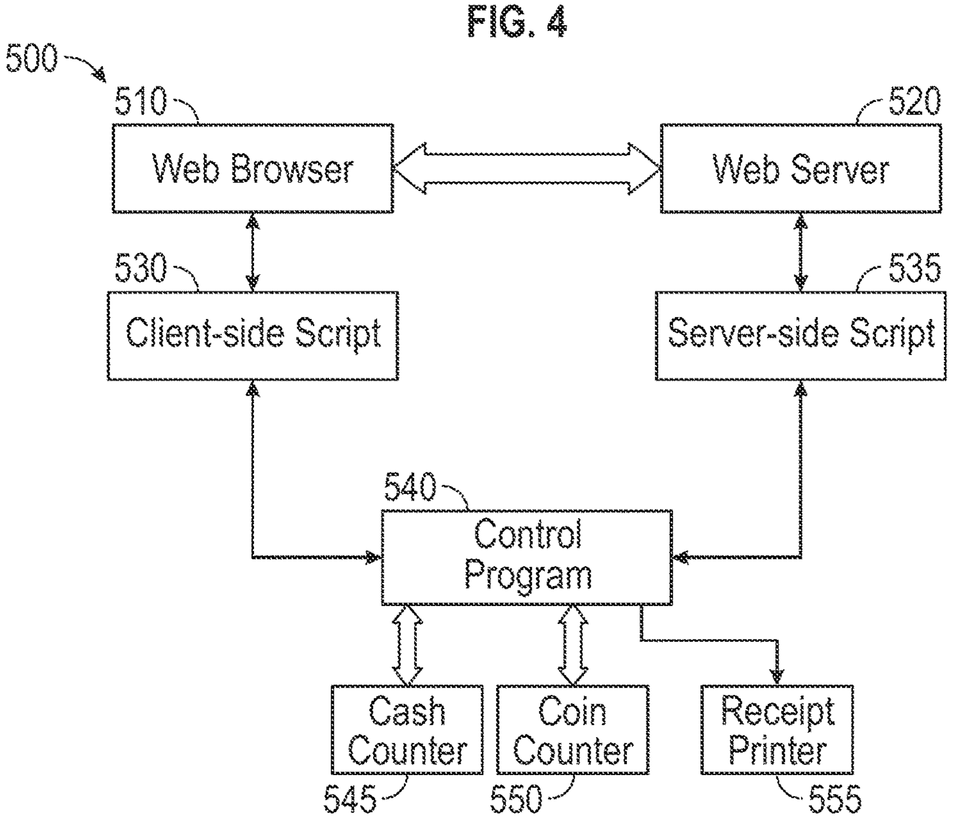
FIG. 5 illustrates a communication flow process, according to an embodiment.

FIG. 5 illustrates an exemplary communication flow process 500, according to an embodiment. Web browser 510, which can be considered the container for the graphical user interface, can display on the touch screen and comprise interface elements that allow it to accept user input. The web browser 510 communicates directly with the web server 520, which sends content back to the web browser 510 (and can display it as a user interface on the touch panel screen and the touch screen can replay user input back to the web browser). The web browser can communicate the user input back to the web server and make additional requests. Both the web server and the web browser can run scripts that communicate directly with the device control program, using an HTTP-like protocol that is compatible with both. The device control program can in turn send the results of the requests back to the client-side and server-side script in a consistent format. The control program can then communicate to and from the bill counting device and the coin counting device to command their operation and receive status. Optionally the control program can also send printable content to a receipt printer. In some aspects, the web browser 510 also has client-side script 530 that communicates directly with control program 540, and server-side script 535 running in the web server 520 also communicates with the control program 540. The control program 540 can communicate bi-directionally with the bill counting device 545 and the coin counting device 550, and sends printable data to receipt printer 555 (when included).

Figure 6:
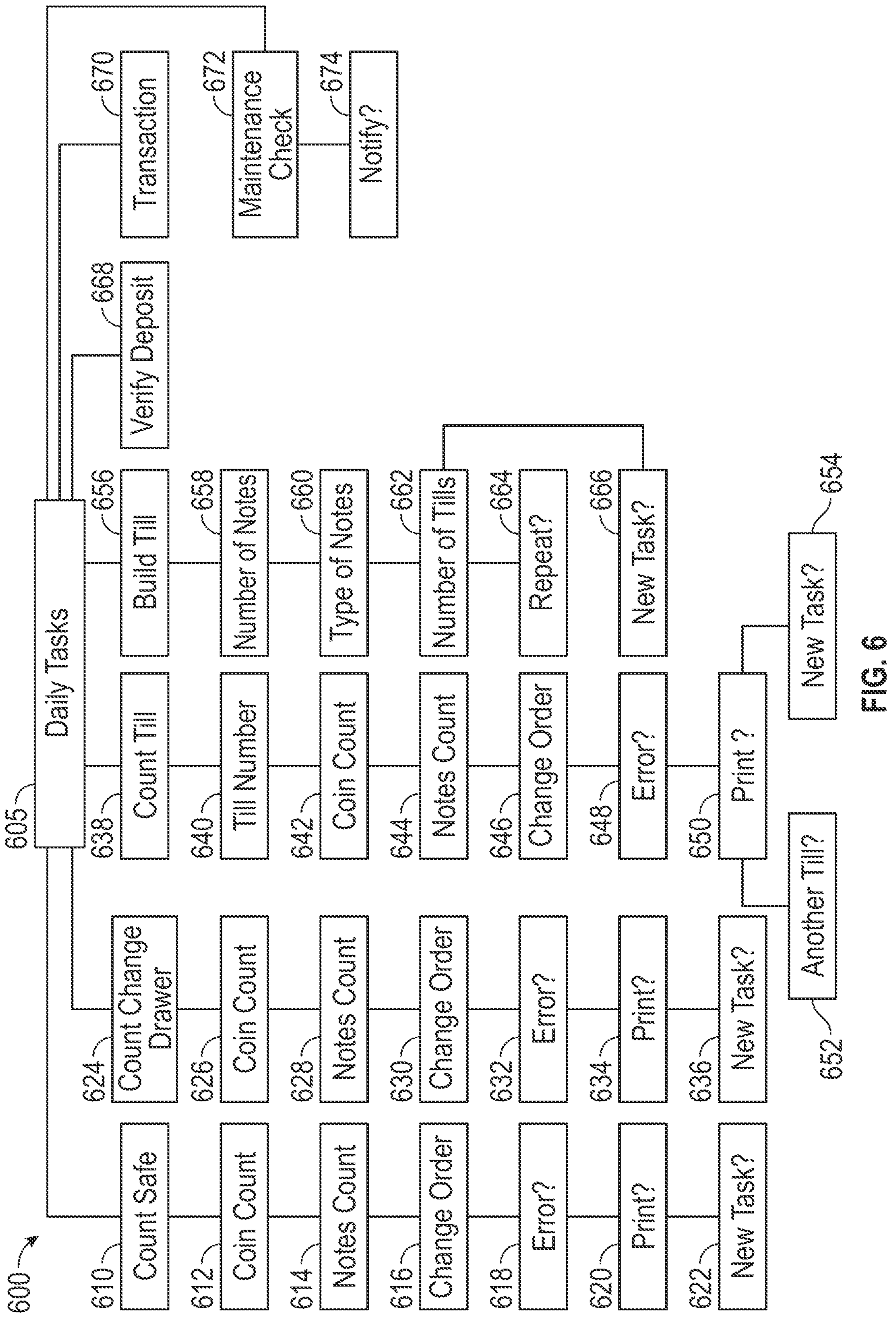
FIG. 6 illustrates an example process for counting and managing currency, according to an embodiment.

FIG. 6 illustrates an example process 600 for counting and managing currency, according to an embodiment. It should be appreciated that contemplated processes can include some or all of the subprocesses shown in FIG. 6 and/or described herein. It should also be appreciated that in some contemplated processes, some or all of the subprocesses can be repeated and/or skipped and/or performed in any suitable order. In some aspects, all of a user's interactions with the system can be via a single tablet (e.g., touch panel display 142 of the computing device 140).

In some aspects, a pre-determined series of steps that an operator would perform as part of a process is provided. In some aspects, a series of instructions can be displayed on a touch panel screen of a computing device to guide an operator in performing the process. In some aspects, an operator can indicate that a step is completed and/or indicate when to proceed to a next step and/or optionally skip a step in a process via the touch panel screen (or other input device). In some aspects, a status (e.g., indicating what steps have been completed and/or need to be completed) can be displayed on a touch panel screen of the computing device to guide the operator. In some aspects, records, reports, receipts and other documents can be printed via a printing device communicative coupled to the computing device. In some aspects, a "batch" capability on one or more counting devices can be utilized. A user can specify numbers of counted coins or notes to be stored in separate rolls, straps, or bags via the touch screen or other input device, which can cause the counting device to pause the count and prompting the operator, for example, to remove the roll, counted coins and/or notes, or bag holding the specified number of counted coins or notes, and optionally to place a new bag or roll. In some aspects, a configuration interface can be provided that allows various parameters, such as the number of tills, to be configured for each installation. In some aspects, a method of updating software and configurations, such as by using a USB storage device, is provided. In some aspects, the systems and methods described herein can provide for communicating via a wired or wireless network, for banking and other purposes. Transactions to a banking system can be performed over a cellular, wired or wireless network, involving the exchange of data with a third-party server for a banking system, in a format that is defined by the banking system. In this case, the balances can be updated and the deposit amounts can be reported, based on the results of the various counting steps and the final 'verify deposit' amount, as needed. Additionally, there can be the capability of reporting details such as the starting amounts on the tills, depending on the kinds of details that the banking system would need. An example of a banking transaction can comprise a deposit or withdrawal of money from a particular location, such as a store and a safe identifier. In some aspects, the system can transmit data associated with money that was counted from individual cash drawers, showing what the retail sales were for each register. Details could include individual currency counts. This could be included along with 'starting amount' information. In some cases, the system could simply report a new balance and the banking system could transact the difference as a deposit or withdrawal. Viewed from another perspective, the system can be used to track money in each location (as defined by the banking system) along with any in-transit deposits.

In some aspects, the systems and methods described herein can maintain counting statistics and other information regarding counting devices. In some aspects, the systems and methods described herein can provide a step to pre-load one or more counted entities with notes, coins, and/or a combination thereof, such as for a till, and to indicate the pre-load amount (e.g., via touch panel display) and on printed reports or receipts. In some aspects, the systems and methods described herein can provide a step to count notes and/or coins that have been removed from a counted entity as part of normal operations.

In some aspects, a counting system can comprise a computing device with a graphical display and touch screen, and one or more currency counting devices, which can be controlled via the computing device using the operating system and software. The computing device can be considered a control device, and can comprise a user interface that provides instructions and information to an operator of the system, and accepts operator inputs to control the overall process. In some aspects, a Linux and/or other operating system can provide the ability to run multiple applications, many of which are industry standards, such as the web browser and local web server, as well as common utilities such as one that can perform queries on a server via the HTTP protocol. The custom web pages, using server-side scripting, can provide the user interface via the web browser, and communicate with the device control program via the HTTP protocol for commands and status to update the dynamic content. In some aspects, client side scripting in the web browser to command the device control program and obtain status may be provided. The device control program can also operate as a type of web server, on a non-standard TCP port, via commands formatted as HTTP requests, allowing both client-side and server-side scripts in the web interface to more easily interact with the device control program. These command requests can initiate a counting process, perform maintenance operations, query status, update manual counts, indicate when a step in the process is complete, cancel a process, and optionally print reports or receipts on an attached or wirelessly coupled printer. In this way the command and control functionality can be integrated with the web browser and web server via client-side and server-side scripts.

In some aspects, the device control program can use multiple threads of execution to perform multiple simultaneous tasks. These can include monitoring counting device status, responding to command requests, controlling the counting process, and/or generally responding to operator actions.

The counting process for a typical retail operation can consist of three basic types of entities to be counted. One is a safe, which can store large amounts of bills, coins, or both, in which the bills may be loose or bundled (e.g., strapped), and the coins may be loose or bundled (e.g., in rolls). A second type of entity to be counted is a change drawer from which an employee can exchange cash for other denominations, as needed, in a normal retail operation. A third type of entity to be counted is a cash drawer (or till) associated with a Point of Sale. In addition to the cash drawers may be 'bags' or other holding methods in which money taken from a cash drawer is stored for later counting.

During a typical counting process, the total balance of the safes, change drawers, and tills along with any amount removed from the cash drawers as part of normal operation, can be recorded, a 'starting amount' can be applied to each of the cash drawers, and bank deposits can be counted and recorded.

By using devices, systems and methods of the disclosure, an operator can be walked through the counting process, and printed reports or receipts can be generated automatically. The counting devices can automatically start and stop at preset points, and the operator can be directed to place notes or coins into the appropriate counting device in a predetermined order or time. The operator can input an indication when a step is complete, and may optionally be able to skip a step when appropriate.

If coins are being counted, and the coin counting device is capable of stopping when the number of coins of a particular denomination reaches a pre-determined amount, a contemplated system can prompt, via a user interface, the operator to empty a coin bin or change a bag that contains the coins of the denomination. The coin counting device could keep a running total of coins, so that each time it stopped, a preset number of coins would be present in the bin, bag, or other device coupled to the counting device. In this way the operator can easily produce a set of pre-determined numbers of coins to facilitate storage or creating a 'starting amount' in a cash drawer.

The counting process can begin with setting (or verifying) the current date of record, which can then appear on a printed report or receipt once a process or portion thereof is completed. The computing device can initialize the equipment coupled thereto (e.g., bill counting device, coin counting device) as may be needed, and the operator can be presented with a list of tasks that can be and/or need to be performed. If the operator chooses to count a safe, certain operations can be performed that are the same and/or different from operations performed when counting a change drawer or a till. In some aspects, when there is only one safe or one change drawer, etc., there may not be need to prompt the operator for any entity identifiers (e.g., Safe #1, Safe #2). In some aspects, where there are more than one of an entity type (e.g., multiple cash drawers), an operator may be prompted to enter an entity identifier (e.g., cash drawer #1, cash drawer #2). Each drawer can be counted and tracked separately, as can any monies that have been removed from them as part of normal operation.

An exemplary counting process 600 is described herein. It should be appreciated that contemplated processes can comprise some, all, and/or repeats of any of the steps described herein, among other steps, in any suitable order.

An operator can power on the computing device of a system, which can also energize the counting devices and optional printer coupled thereto. An input/output device (e.g., graphical display) can display an interface that allows the operator to use a touch screen to select to perform daily tasks, in accordance with step 605. The operator may enter or confirm the date of record via the touch screen or other input device, and select a first task from a list of task options (or automatically be prompted to perform the first task), which in this example is to count the safe, in accordance with step 610. The operator can then be instructed, for example via the touch screen or other output device, to perform a first operation, which can comprise counting coins, in accordance with step 612. Counting coins 612 can comprise one or more steps, including counting the number of coin rolls by denomination, entering the number and/or total $ value of coin rolls by denomination (e.g., via the touch screen or other input device), and placing loose coins in a hopper of the coin counting device to be counted and/or sorted. In some aspects, certain denominations (e.g., half dollar coins) may be manually counted and a total ($ amount, number of coins, and/or value of coin) can be entered into the system via the touch screen or other input device. In some aspects, once a use indicates coins have been placed in a hopper (e.g., via the touch screen), the coin counting device can automatically begin counting and/or sorting the coins (e.g., without operator intervention). The coin count can proceed, optionally stopping when a specified amount of coin for a particular denomination has been reached, referred to herein as a "batch." If a batch count causes the coin counting device to stop, the operator can be prompted that a batch has been reached and for the coin denomination. The operator can input an indication when the batched coins have been correctly handled, to continue counting coins. The coin counting device can continue counting the coins until there are no more coins in the hopper. At this point the operator can be prompted to either add more coins and resume counting, or to indicate that coin counting is complete. In some aspects, the total amounts (e.g., # of coins per denomination, $ amount per denomination, total $ amount counted) can be entered by the operator via the touch screen or other input device, and/or data corresponding to such amounts can automatically be received by the computing device from the coin counting device, and optionally displayed on the touch screen or other output device. In some aspects, a user may indicate, via the touch screen or other input device, that the coin count step is complete and that the system can proceed to the next step.

The operator can be instructed to perform a second operation, which can comprise counting notes, in accordance with step 614. Counting notes can comprise one or more steps, including, for example, the operator being prompted (e.g., via the touch screen or other output device) to count the number of strapped notes by denomination, enter the number and/or total $ value of strapped notes by denomination and/or by strapped bundle (e.g., via the touch screen or other input device), and place loose notes into the bill counting machine hopper, which can count and/or separate the notes. If any notes are rejected, the operator can be notified and/or instructed to remove them from the reject tray. Additional notes may be added to the bill counting machine, until all of them from the safe have been counted. In some aspects, the total amounts (e.g., # of notes per denomination, $ amount per denomination, total $ amount counted) can be entered by the operator via the touch screen or other input device, and/or data corresponding to such amounts can automatically be received by the computing device from the bill counting device, and optionally displayed on the touch screen or other output device. In some aspects, a user may indicate, via the touch screen or other input device, that the notes count step is complete and that the system can proceed to the next step.

In some contemplated embodiments, an operator may be prompted, via touch screen or other output device, for a change order, in accordance with step 616, which can consist of an amount that has been withdrawn from the safe to purchase coin or other currency, but that delivery has not yet been received. In some aspects, a change order is an order to and/or from the bank to provide change for coins and/or notes. A typical retail outlet will give change to the customers in excess of what it takes in, so there is a constant flow of coin and notes to the customers, often with larger bills (e.g., $20, $50, $100 bills) coming into the retail store environment and smaller bills and coins going to the customer as change. When the safe in a store lacks sufficient operator currency, a change order can be made to the bank (e.g., employee or courier takes currency (along with any deposits) to the bank and receives the "change" in different denominations (e.g., take $100s to the bank and come back with $5s, $1s, and/or coins). While in transit, the money can still technically be considered "in the safe" as far as accounting is concerned, so the operator can indicate the amount of the "change order" currency that has been sent to the bank but not yet received back as change. For example, if a change order for $500 worth of $1 bills, $5 bills, and coin rolls was made with an earlier deposit (e.g., the previous day's deposit), and the change has not yet been received, the safe may be $500 short, and the operator can indicate that there is a $500 change order so that the safe total is correct for accounting purposes.

In some contemplated systems, a change order can be completed for a Change Drawer and/or a Till.

In another step, the operator can be presented with a totals screen. For example, the totals screen can have user interface elements that allow a step to be re-performed, in case of an error. In some aspects, the system can determine when an error is likely (e.g., based on the various counts/totals) and transmit an alert or notification via the touch screen or other output device, in accordance with step 618.

Once the safe has been counted to an operator's satisfaction (e.g., the full safe is counted, including change orders), the operator can input an indication that the safe count is complete. In some processes, an operator can be presented with an option to print a receipt indicating the amounts counted for the Safe, the total balance, and/or other information, in accordance with step 622. The operator can then be presented with a screen that indicates that all of the 'Safe' entities have been counted.

The operator can be presented with options to select a second task, to repeat one or more steps of the first task, or be instructed to repeat one or more steps of the first task and/or perform a second task, which can be to count the change drawer, in accordance with step 624.

Counting the change drawer can involve steps identical or similar to counting a safe. The operator can be instructed, for example via the touch screen or other output device, to perform a first operation, which can comprise counting coins, in accordance with step 624. Counting coins 624 can comprise one or more steps, including counting the number of coin rolls by denomination, entering the number and/or total $ value of coin rolls by denomination (e.g., via the touch screen or other input device), and placing loose coins in a hopper of the coin counting device to be counted and/or sorted. In some aspects, certain denominations (e.g., half dollar coins) may be manually counted and a total ($ amount, number of coins, and/or value of coin) can be entered into the system via the touch screen or other input device. In some aspects, once a use indicates coins have been placed in a hopper (e.g., via the touch screen), the coin counting device can automatically begin counting and/or sorting the coins (e.g., without operator intervention). The coin count can proceed, optionally stopping when a specified amount of coin for a particular denomination has been reached, referred to herein as a "batch." If a batch count causes the coin counting device to stop, the operator can be prompted that a batch has been reached and for the coin denomination. The operator can input an indication when the batched coins have been correctly handled, to continue counting coins. The coin counting device can continue counting the coins until there are no more coins in the hopper. At this point the operator can be prompted to either add more coins and resume counting, or to indicate that coin counting is complete. In some aspects, the total amounts (e.g., # of coins per denomination, $ amount per denomination, total $ amount counted) can be entered by the operator via the touch screen or other input device, and/or data corresponding to such amounts can automatically be received by the computing device from the coin counting device, and optionally displayed on the touch screen or other output device. In some aspects, a user may indicate, via the touch screen or other input device, that the coin count step is complete and that the system can proceed to the next step.

The operator can be instructed to perform a second operation, which can comprise counting notes, in accordance with step 628. Counting notes can comprise one or more steps, including, for example, the operator being prompted (e.g., via the touch screen or other output device) to count the number of strapped notes by denomination, enter the number and/or total $ value of strapped notes by denomination and/or by strapped bundle (e.g., via the touch screen or other input device), and place loose notes into the bill counting machine hopper, which can count and/or separate the notes. If any notes are rejected, the operator can be notified and/or instructed to remove them from the reject tray. Additional notes may be added to the bill counting machine, until all of them from the change drawer have been counted. In some aspects, the total amounts (e.g., # of notes per denomination, $ amount per denomination, total $ amount counted) can be entered by the operator via the touch screen or other input device, and/or data corresponding to such amounts can automatically be received by the computing device from the bill counting device, and optionally displayed on the touch screen or other output device. In some aspects, a user may indicate, via the touch screen or other input device, that the notes count step is complete and that the system can proceed to the next step.

In some contemplated processes, an operator may be prompted, via touch screen or other output device, for a change order, in accordance with step 630, which can consist of an amount that has been withdrawn from the change drawer to purchase coin or other currency, but that delivery has not yet been received. In some aspects, a change order is an order to and/or from the bank to provide change for coins and/or notes. A typical retail outlet will give change to the customers in excess of what it takes in, so there is a constant flow of coin and notes to the customers, often with larger bills (e.g., $20, $50, $100 bills) coming into the retail store environment and smaller bills and coins going to the customer as change. When the safe in a store lacks sufficient operator currency, a change order can be made to the bank (e.g., employee or courier takes currency (along with any deposits) to the bank and receives the "change" in different denominations (e.g., take $100s to the bank and come back with $5s, $1s, and/or coins). While in transit, the money can still technically be considered "in the safe" as far as accounting is concerned, so the operator can indicate the amount of the "change order" currency that has been sent to the bank but not yet received back as change. For example, if a change order for $500 worth of $1 bills, $5 bills, and coin rolls was made with an earlier deposit (e.g., the previous day's deposit), and the change has not yet been received, the safe may be $500 short, and the operator can indicate that there is a $500 change order so that the safe total is correct for accounting purposes.

In some contemplated systems, a change order can be completed for a Change Drawer and/or a Till.

In another step, the operator can be presented with a totals screen. For example, the totals screen can have user interface elements that allow a step to be re-performed, in case of an error. In some aspects, the system can determine when an error is likely (e.g., based on the various counts/totals) and transmit an alert or notification via the touch screen or other output device, in accordance with step 632.

Once the change drawer has been counted to an operator's satisfaction (e.g., the full change drawer is counted, including change orders), the operator can input an indication that the change drawer count is complete. In some processes, an operator can be presented with an option to print a receipt indicating the amounts counted for the change drawer, the total balance, and/or other information, in accordance with step 634. The operator can then be presented with a screen that indicates that all of the 'Change Drawer" entities have been counted.

The operator can be presented with options to select a third task, to repeat one or more steps of the first task and/or second, or be instructed to repeat one or more steps of the first task and/or second task and/or perform a third task, which can be to count one or more tills and/or pulls (the currency removed from the tills/cash drawers during normal operation), in accordance with step 638.

Counting tills can involve steps identical or similar to counting a safe. In some aspects, an operator can additionally be instructed to enter a till identifier (e.g., till #) for a till being counted and/or to select from a list of known tills to be counted. In some aspects, multiple tills can be identified and/or counted. When counting pulls, the operator can again be presented with an option to choose a till. This can allow the operator to repeat certain steps (e.g., notes and coin count) until all of the pulls (e.g., all pulls associated with a till) have been counted, at which point the operator instructs the system that this part of the process is complete.

The operator can be instructed, for example via the touch screen or other output device, to perform a first operation (optionally after entering a till identifier), which can comprise counting coins, in accordance with step 642. Counting coins 642 can comprise one or more steps, including counting the number of coin rolls by denomination, entering the number and/or total $ value of coin rolls by denomination (e.g., via the touch screen or other input device), and placing loose coins in a hopper of the coin counting device to be counted and/or sorted. In some aspects, certain denominations (e.g., half dollar coins) may be manually counted and a total ($ amount, number of coins, and/or value of coin) can be entered into the system via the touch screen or other input device. In some aspects, once a use indicates coins have been placed in a hopper (e.g., via the touch screen), the coin counting device can automatically begin counting and/or sorting the coins (e.g., without operator intervention). The coin count can proceed, optionally stopping when a specified amount of coin for a particular denomination has been reached, referred to herein as a "batch." If a batch count causes the coin counting device to stop, the operator can be prompted that a batch has been reached and for the coin denomination. The operator can input an indication when the batched coins have been correctly handled, to continue counting coins. The coin counting device can continue counting the coins until there are no more coins in the hopper. At this point the operator can be prompted to either add more coins and resume counting, or to indicate that coin counting is complete. In some aspects, the total amounts (e.g., # of coins per denomination, $ amount per denomination, total $ amount counted) can be entered by the operator via the touch screen or other input device, and/or data corresponding to such amounts can automatically be received by the computing device from the coin counting device, and optionally displayed on the touch screen or other output device. In some aspects, a user may indicate, via the touch screen or other input device, that the coin count step is complete and that the system can proceed to the next step.

The operator can be instructed to perform a second operation, which can comprise counting notes, in accordance with step 644. Counting notes can comprise one or more steps, including, for example, the operator being prompted (e.g., via the touch screen or other output device) to count the number of strapped notes by denomination, enter the number and/or total $ value of strapped notes by denomination and/or by strapped bundle (e.g., via the touch screen or other input device), and place loose notes into the bill counting machine hopper, which can count and/or separate the notes. If any notes are rejected, the operator can be notified and/or instructed to remove them from the reject tray. Additional notes may be added to the bill counting machine, until all of them from the till have been counted. In some aspects, the total amounts (e.g., # of notes per denomination, $ amount per denomination, total $ amount counted) can be entered by the operator via the touch screen or other input device, and/or data corresponding to such amounts can automatically be received by the computing device from the bill counting device, and optionally displayed on the touch screen or other output device. In some aspects, a user may indicate, via the touch screen or other input device, that the notes count step is complete and that the system can proceed to the next step.

In some contemplated processes, an operator may be prompted, via touch screen or other output device, for a change order, in accordance with step 646, which can consist of an amount that has been withdrawn from the till to purchase coin or other currency, but that delivery has not yet been received. In some aspects, a change order is an order to and/or from the bank to provide change for coins and/or notes. A typical retail outlet will give change to the customers in excess of what it takes in, so there is a constant flow of coin and notes to the customers, often with larger bills (e.g., $20, $50, $100 bills) coming into the retail store environment and smaller bills and coins going to the customer as change. When the safe in a store lacks sufficient operator currency, a change order can be made to the bank (e.g., employee or courier takes currency (along with any deposits) to the bank and receives the "change" in different denominations (e.g., take $100s to the bank and come back with $5s, $1s, and/or coins). While in transit, the money can still technically be considered "in the safe" as far as accounting is concerned, so the operator can indicate the amount of the "change order" currency that has been sent to the bank but not yet received back as change. For example, if a change order for $500 worth of $1 bills, $5 bills, and coin rolls was made with an earlier deposit (e.g., the previous day's deposit), and the change has not yet been received, the safe may be $500 short, and the operator can indicate that there is a $500 change order so that the safe total is correct for accounting purposes.

In some contemplated systems, a change order can be completed for a Change Drawer and/or a Till.

In another step, the operator can be presented with a totals screen. For example, the totals screen can have user interface elements that allow a step to be re-performed, in case of an error. In some aspects, the system can determine when an error is likely (e.g., based on the various counts/totals) and transmit an alert or notification via the touch screen or other output device, in accordance with step 648.

Once the till has been counted to an operator's satisfaction (e.g., the full till and pulls from the till are counted, including change orders), the operator can input an indication that the till count is complete. In some processes, an operator can be presented with an option to print a receipt indicating the amounts counted for the till, the total balance, and/or other information, in accordance with step 650. In some processors, the print can be automatic. In some aspects, an operator can be presented with an option to count another till 652 once a till count is complete (e.g., by being presented with a screen with a selection of tills and/or an option to enter a till identifier), and one or more of steps 638, 640, 642, 644, 646, 648, and 650 can be repeated any number of times to count any suitable number of tills. The operator can then be presented with a screen that indicates that all of the 'tills" entities have been counted and/or an indication of any tills (e.g., in a given retail store location) that should be counted that have not yet been counted. In some aspects, for example once the entire process of counting pulls and tills is complete, the operator could indicate the tills are "All Counted", and the system can total all of the registers and starting amounts and optionally prints a Register Summary.

In some aspects, the operator can be presented with the task screen that indicates what entities have been counted/tasks have been completed. For example, after the safe has been counted, the operator can be presented with the task screen indicating the safe count is complete and the change drawer and tills have to be completed. If the safe and one till has been counted but the change drawer and several other tills need to be counted, the operator can be presented with the task screen indicating the safe count is complete and the change drawer and tills have to be completed.

In some processes, an operator can be presented with options to select a fourth task, to repeat one or more steps of the first task, second task and/or third task, or be instructed to repeat one or more steps of the first task, second task, and/or third task and/or perform a fourth task, which can be to build one or more tills, in accordance with step 656.

Generally building tills is a manual process that must be done each day, essentially pre-loading the cash drawers with a specified amount of notes and coins of different denominations. As an example, if the drawer starts off each day with $200 in it, you might have $182 in notes (5-$20, 5-$10, 5-$5, 7-$1), and $18 in coins (40 quarters, 50 dimes, 40 nickels, and 100 pennies, essentially 1 roll each for quarters, dimes, nickels and 2 rolls of pennies). The operator could set this amount aside for each till using the system to assist counting it, putting a large stack of, for example, $20 notes into the counter, selecting a number (e.g., 5) for the strap quantity, and then putting the stacks of 5-$20 in each of the cash drawers (e.g., 5, 10, 15, 20 at least 5, at least 10, at least 15, at least 20 tills). Thus, contemplated systems can advantageously provide for a more efficient and accurate way of building a till with reduced human error.

It should be appreciated that in some aspects, data gathered from one or more currency counting systems from one or more retail stores (or other establishments) can be used to, among other things, track specific registers, calculate and/or view statistics, and/or determine ideal starting balances on an updated and ongoing basis based on information gathered from the systems.

The "build till" task can leverage the abilities of the bill counting machine to create note batches of a specified quantity. For example, the operator can indicate (e.g., via the touch screen of the computing device or any other input device) the number of notes 658 of a particular denomination needed, the type of note (e.g., denomination) 660, and optionally the number of tills 662. The system can cause the bill counting machine to count the number of the type of note indicated and stop. When the operator removes the counted notes from the stacking tray of the bill counting device, the bill counting machine can count the same number of the same type of note indicated and stop. In some aspects, the bill counting machine can start the second count, for example, based on an indication by the user (e.g., via the touch screen or other input device) that the first batch has been removed. The bill counting machine can continue/repeat this process until the correct batch of the type of note for all tills have been counted by the bill counting machine. In this way the operator can place the exact number of notes of that denomination into each drawer efficiently, either by setting the amounts aside, or by placing them directly into the cash drawers during the process. The operator can then repeat some or all of the step of the build till task for the next denomination until all of the notes for each cash drawer have been counted with the correct amount. In some aspects, an operator can be presented with an option to repeat some or all of the build till tasks via the touch screen or other user interface, in accordance with step 664. In some aspects, any coin bags produced during the coin counting process, along with standard coin rolls, can be added in the correct amount to each cash drawer. In some aspects, an operator can cause a till total to be printed noting the total $ amount in a till, the number of notes and/or coins of each denomination, or any other suitable information. At this point in this example, the operator can instruct the system (e.g., via touch screen of the computing device) that this part of the process is complete, and be returned to a task screen, indicating the completion of this and previous tasks.

In some aspects, a process may include a "verify deposit" task 668. This task can allow for multiple re-counts and optionally printing the final count on a receipt. As before, when completed the operator can indicate that the process is complete, and be returned to the task screen, indicating the completion of this and previous tasks. When all tasks have been completed, the system can optionally print a report, optionally make transactions to a banking system 670, optionally run a maintenance check 672, and optionally transmit a notification 674 (e.g., to a user system, the touch screen of the computing device, and/or an external system, for example, operated by a maintenance company) if any maintenance operations (such as cleaning) need to be performed.

In some aspects, an operator can enter a code and get instructions for a particular function, for example, via the touch panel screen of and/or coupled to the computing device. Contemplated functions include, for example, replacing a counting device, viewing a count statistic of a counting device, obtaining statistics, a cleaning process (e.g., daily, weekly, monthly). These can be useful to help troubleshoot issues. When a cleaning card is used on the counting device, it can run the counting device in cleaning mode and record the date, and reminds an operator how long it has been since the last cleaning (e.g., when it is within a certain number of days for the next cleaning). Other cleaning tasks can include simple 'canned air' and bristle brush steps specifying specific areas to clean, what doors to open/lid to lift to eliminate accumulated dust and the like. Coins and notes are rather filthy and create a lot of dust and grime and so the cleaning step is important when thousands of dollars are run through the machinery every day.

Although the processes herein are sometimes described with tasks and steps having a particular order, it should be appreciated that the tasks and steps can be completed in any order (e.g., bill count before coin count; till count before safe count or change drawer count), and that a process may include some but not all of the steps described herein, and/or may include additional steps and/or repeated steps.

Figure 7:
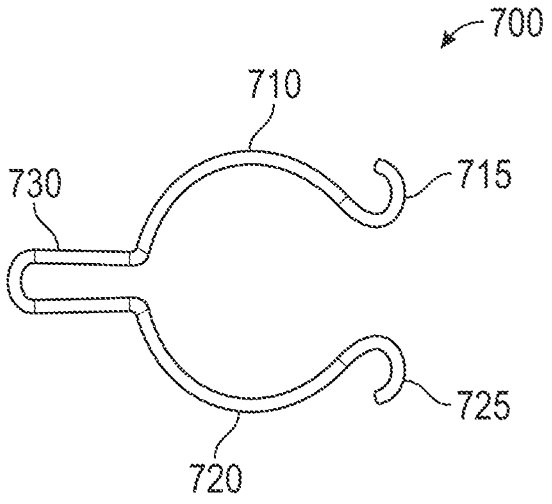
FIG. 7 illustrates a clip for a coin counting device, according to an embodiment.

FIG. 7 illustrates a clip for a coin counting device, according to an embodiment. Clip 700 has a first rounded arm 710 and a second rounded arm 720, each of which extend from a central portion. In some aspects, the central portion can comprise a central elongated U-shaped portion 730, and the first and second rounded arms can extend from the open arm end portions of the central elongated U-shaped portion 730. In some aspects, the U-shaped portion can advantageously be used to hang the clip 700 from a hook, rack, or other device. The U-shaped portion can also advantageously be used to assist in placing or removing the clip from a coin chute. First rounded arm 710 and second rounded arm 720 are curved such that a coin chute can be positioned at least partially between the first rounded arm 710 and second rounded arm 720. First rounded arm 710 can comprise a hooked end portion 715 that curves in a direction different from the rest of first rounded arm 710. In some aspects, the first rounded arm 710 can include a double curve resembling the letter "S" with a hook end portion 715 being smaller than the remaining portion of first rounded arm 710. Second rounded arm 720 can comprise a hooked end portion 725 that curves in a direction different from the rest of second rounded arm 720. In some aspects, the second rounded arm 720 can include a double curve resembling the letter "S" with a hook end portion 725 being smaller than the remaining portion of second rounded arm 720.

Figure 8:
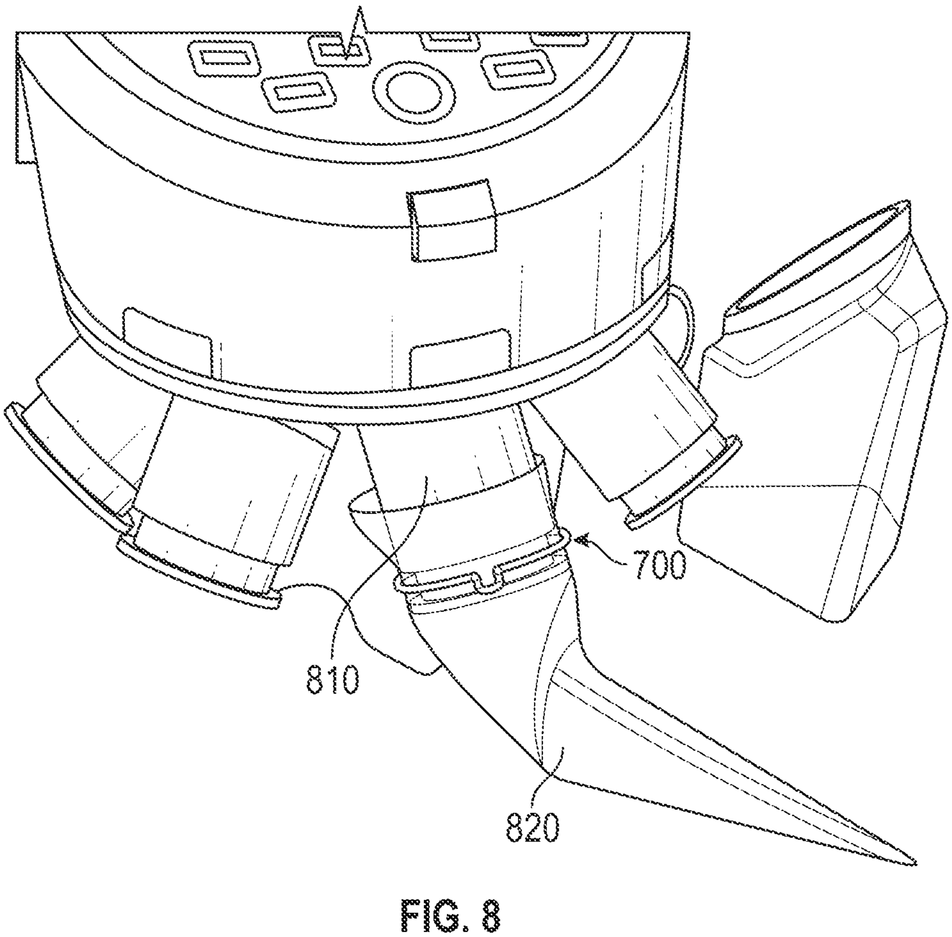
FIG. 8 illustrates the clip positioned on a coin chute of a coin counting device, according to an embodiment.

FIG. 8 illustrates clip 700 positioned over a bag 820 with an open end of bag 820 placed around an end portion of coin chute 810 of a coin counting device, according to an embodiment.

Thus, specific examples of systems and methods for counting and managing currency have been disclosed. The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a," "an," and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Certain numerical values and ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system, comprising:

a first currency counting device;

a second currency counting device; and a computing device communicatively coupled to the first currency counting device and the second currency counting device, the computing device comprising:

one or more processors; and a memory storing software instructions that, when executed by the one or more processors, cause the one or more processors to:

display or send a first instruction, via a touch panel display, to insert a first set of currency into a first currency receiving component of the first currency counting device;

cause the first currency counting device to count the first set of currency;

receive, via a touch panel display, a first indication that all items in the first set of currency have been counted by the first currency counting device;

display or send a second instruction, via the first output device, to insert a second set of currency into a second currency receiving component of the second currency counting device;

cause the second currency counting device to count the second set of currency;

receive, via a touch panel display, a second indication that all items in the second set of currency have been counted by the second currency counting device; and generate and display or print a report relating to at least one of a safe, a change drawer, or a cash drawer, the report based at least in part on a count of the first set of currency by the first currency counting device and a count of the second set of currency by the second currency counting device.

2. The system of claim 1, further comprising a printer communicatively coupled to the computing device.

3. The system of claim 2, wherein the software instructions, when executed by the one or more processors, further cause the one or more processors to print the report via the printer.

4. The system of claim 1, wherein the first currency counting device is a bill counting device, and wherein the second currency counting device is a coin counting device.

5. The system of claim 1, wherein the software instructions, when executed by the one or more processors, further cause the report to be displayed via the touch panel display.

6. The system of claim 1, wherein the software instructions, when executed by the one or more processors, further cause the one or more processors to:

receive, via the touch panel display, an indication of a quantity of the first type of currency needed to build a till;

cause the first currency counting device to count the quantity of the first type of currency and stop;

receive, via the touch panel display, an indication of a quantity of a third type of currency needed to build the till; and cause the first currency counting device to count the quantity of the third type of currency and stop.

7. The system of claim 1, wherein the software instructions, when executed by the one or more processors, further cause the one or more processors to:

receive, via the touch panel display, an indication of a quantity of the first type of currency needed to build a till;

receive, via the touch panel display, an indication of a number of tills; and cause the first currency counting device to count the quantity of the first type of currency multiplied by the number of tills, pausing after each instance the quantity of the first type of currency has been counted.

8. The system of claim 1, wherein the software instructions, when executed by the one or more processors, further:

reformat the report to generate a reformatted report according to a first template report.

9. The system of claim 1 wherein the software instructions, when executed by the one or more processors, further cause the one or more processors to:

transmit a notification to a remote user system, wherein the notification is associated with a currency pick up time.

10. The system of claim 1 wherein the software instructions, when executed by the one or more processors, further cause the one or more processors to:

determine a quantity of the first type of currency and a quantity of the second type of currency for a till based at least in part on a count of the first set of currency by the first currency counting device and a count of the second set of currency by the second currency counting device; and upon receipt of an indication to build a till via the touch panel display, cause the first currency counting device to count the quantity of the first type of currency and stop.

11. A method comprising using at least one hardware processor to:

display or send a first instruction, via a touch panel display, to insert a first set of currency into a first currency receiving component of a first currency counting device;

cause the first currency counting device to count the first set of currency;

display or send a second instruction, via the touch panel display, to insert a second set of currency into a second currency receiving component of a second currency counting device;

cause the second currency counting device to count the second set of currency;

receive an indication, via a touch panel display, that a count is complete; and generate and display or print a report relating to at least one of a safe, a change drawer, or a cash drawer, the report based at least in part on a count of the first set of currency by the first currency counting device and a count of the second set of currency by the second currency counting device.

12. The method of claim 11, further comprising using the at least one hardware processor to:

receive, via the touch panel display, an indication of a quantity of the first type of currency needed to build a till;

cause the first currency counting device to count the quantity of the first type of currency and stop;

receive, via the touch panel display, an indication of a quantity of a second type of currency needed to build the till; and cause the first currency counting device to count the quantity of the second type of currency and stop.

13. The method of claim 11, further comprising using the at least one hardware processor to:

receive, via the touch panel display, an indication of a quantity of the first type of currency needed to build a till;

receive, via the touch panel display, an indication of a number of tills; and cause the first currency counting device to count the quantity of the first type of currency multiplied by the number of tills, pausing after each instance the quantity of the first type of currency has been counted.

14. The method of claim 11, further comprising using the at least one hardware processor to:

reformat the report to generate a reformatted report according to a first template report.

15. The method of claim 11, further comprising using the at least one hardware processor to:

transmit a notification to a remote user system, wherein the notification is associated with a currency pick up time.

16. The method of claim 11, further comprising using the at least one hardware processor to:

determine a quantity of the first type of currency and a quantity of the second type of currency for a till based at least in part on a count of the first set of currency by the first currency counting device and a count of the second set of currency by the second currency counting device; and upon receipt of an indication to build a till via the touch panel display, cause the first currency counting device to count the quantity of the first type of currency and stop.

17. A non-transitory computer-readable medium having instructions stored therein, wherein the instructions, when executed by a processor, cause the processor to:

display or send a first instruction, via a touch panel display, to insert a first set of currency into a first currency receiving component of a first currency counting device;

cause the first currency counting device to count the first set of currency;

display or send a second instruction, via the touch panel display, to insert a second set of currency into a second currency receiving component of a second currency counting device;

cause the second currency counting device to count the second set of currency;

receive an indication, via a the touch panel display, that a count is complete; and generate a report relating to at least one of a safe, a change drawer, or a cash drawer, the report based at least in part on a count of the first set of currency by the first currency counting device and a count of the second set of currency by the second currency counting device.

18. The non-transitory computer-readable medium of claim 17, wherein the instructions, when executed by the processor, further cause the processor to:

receive, via the touch panel display, an indication of a quantity of the first type of currency needed to build a till;

cause the first currency counting device to count the quantity of the first type of currency and stop;

receive, via the touch panel display, an indication of a quantity of a third type of currency needed to build the till; and cause the first currency counting device to count the quantity of the third type of currency and stop.

19. The non-transitory computer-readable medium of claim 17, wherein the instructions, when executed by the processor, further cause the processor to:

receive, via the touch panel display, an indication of a quantity of the first type of currency needed to build a till;

receive, via the touch panel display, an indication of a number of tills; and cause the first currency counting device to count the quantity of the first type of currency multiplied by the number of tills, pausing after each instance the quantity of the first type of currency has been counted.

20. The non-transitory computer-readable medium of claim 17, wherein the instructions, when executed by the processor, further cause the processor to:

reformat the report to generate a reformatted report according to a first template report.

21. The non-transitory computer-readable medium of claim 17, wherein the instructions, when executed by the processor, further cause the processor to:

transmit a notification to a remote user system, wherein the notification is associated with a currency pick up time.

22. The non-transitory computer-readable medium of claim 17, wherein the instructions, when executed by the processor, further cause the processor to:

determine a quantity of the first type of currency and a quantity of the second type of currency for a till based at least in part on a count of the first set of currency by the first currency counting device and a count of the second set of currency by the second currency counting device; and upon receipt of an indication to build a till via the touch panel display, cause the first currency counting device to count the quantity of the first type of currency and stop.

* * * * *